US007928685B2

(12) United States Patent
Dornauer et al.

(10) Patent No.: US 7,928,685 B2
(45) Date of Patent: Apr. 19, 2011

(54) METHOD OF MANUFACTURING A STARTING DEVICE FOR A THREE PHASE ELECTRIC MOTOR, AND A STARTING DEVICE

(75) Inventors: Marco Dornauer, Heroldsberg (DE); Markus Meier, Rieden (DE); Peter Schlegl, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 371 days.

(21) Appl. No.: 12/084,951

(22) PCT Filed: Nov. 21, 2005

(86) PCT No.: PCT/EP2005/012441

§ 371 (c)(1),
(2), (4) Date: May 14, 2008

(87) PCT Pub. No.: WO2007/057045

PCT Pub. Date: May 24, 2007

(65) Prior Publication Data

US 2009/0167233 A1 Jul. 2, 2009

(51) Int. Cl.
*H02P 1/16* (2006.01)

(52) U.S. Cl. ........ 318/778; 318/445; 361/23; 200/50.32

(58) Field of Classification Search .................. 318/445, 318/446, 778; 200/50.32, 51.11; 335/132; 361/23, 31, 42

See application file for complete search history.

(56) References Cited

U.S. PATENT DOCUMENTS

| | | | | |
|---|---|---|---|---|
| 4,899,120 | A | 2/1990 | Ohtake et al. | |
| 5,652,420 | A * | 7/1997 | Innes et al. | 200/50.32 |
| 5,706,153 | A * | 1/1998 | Innes et al. | 361/31 |
| 6,064,289 | A * | 5/2000 | Wieloch et al. | 335/132 |
| 6,794,967 | B1 * | 9/2004 | Park | 335/159 |
| 7,057,311 | B1 * | 6/2006 | Zhou et al. | 307/131 |
| 7,130,170 | B2 * | 10/2006 | Wakefield et al. | 361/23 |
| 7,224,557 | B2 * | 5/2007 | Kinsella et al. | 361/2 |
| 7,242,116 | B2 * | 7/2007 | Kawazu et al. | 307/326 |
| 7,307,227 | B2 * | 12/2007 | Buettner | 200/51.11 |
| 7,576,449 | B2 * | 8/2009 | Becker et al. | 307/45 |
| 7,612,972 | B2 * | 11/2009 | Battani et al. | 361/42 |
| 7,636,615 | B2 * | 12/2009 | Pfingsten et al. | 700/286 |
| 7,652,395 | B2 * | 1/2010 | Von Arx et al. | 307/112 |
| 7,746,649 | B2 * | 6/2010 | Miller et al. | 361/715 |
| 2002/0093774 | A1 | 7/2002 | Chung | |

(Continued)

FOREIGN PATENT DOCUMENTS

CN 1375923 A 10/2002

(Continued)

OTHER PUBLICATIONS

International Search Report dated Jul. 13, 2006 in corresponding International Application No. PCT/EP2005/012441.

(Continued)

*Primary Examiner* — Paul Ip
(74) *Attorney, Agent, or Firm* — Harness, Dickey & Pierce, P.L.C.

(57) ABSTRACT

When manufacturing a starting device for a three-phase electric motor, especially a soft starter, in at least one embodiment an arc quenching system is at least partly removed from a commercially available contactor that so becomes to a modified contactor. In at least one embodiment, a modified contactor is used as a contactor in the starting device.

11 Claims, 3 Drawing Sheets

200B

U.S. PATENT DOCUMENTS

| | | | | |
|---|---|---|---|---|
| 2002/0109570 | A1* | 8/2002 | Sudan et al. | 335/132 |
| 2002/0130742 | A1* | 9/2002 | Jacq et al. | 335/132 |
| 2004/0109293 | A1* | 6/2004 | Apfelbacher et al. | 361/709 |
| 2004/0218317 | A1* | 11/2004 | Kawazu et al. | 361/1 |
| 2005/0185350 | A1* | 8/2005 | Wakefield et al. | 361/23 |
| 2008/0150660 | A1* | 6/2008 | Birzer et al. | 335/106 |
| 2008/0164831 | A1* | 7/2008 | Miller et al. | 318/445 |
| 2008/0264906 | A1* | 10/2008 | Kozar et al. | 218/157 |
| 2008/0308394 | A1* | 12/2008 | Premerlani et al. | 200/181 |
| 2009/0273419 | A1* | 11/2009 | Mitlmeier et al. | 335/127 |
| 2009/0321393 | A1* | 12/2009 | Bahlinger et al. | 218/149 |
| 2010/0079922 | A1* | 4/2010 | Blakely et al. | 361/87 |

FOREIGN PATENT DOCUMENTS

| | | |
|---|---|---|
| WO | WO 01/54154 | 7/2001 |
| WO | WO 2005/036577 | 4/2005 |

OTHER PUBLICATIONS

Office Action for Chinese patent application No. 2005800521192 dated Jan. 29, 2010.

* cited by examiner

Conventional Art

METHOD OF MANUFACTURING A STARTING DEVICE FOR A THREE PHASE ELECTRIC MOTOR, AND A STARTING DEVICE

PRIORITY STATEMENT

This application is the national phase under 35 U.S.C. §371 of PCT International Application No. PCT/EP2005/012441 which has an International filing date of Nov. 21, 2005, which designated the United States of America, the entire contents of which are hereby incorporated herein by reference.

FIELD

At least one embodiment of the invention generally relates to manufacturing of starting devices for three-phase electric motors and/or to such starting devices. More particularly, at least one embodiment relates to manufacturing of starting devices for three-phase electric motors in the higher power range suitable for operating currents larger than 29 A, and/or to such starting devices.

BACKGROUND ART

If a three-phase electric motor is started directly or using star-delta starting, unpleasant side-effects such as mechanical impacts inside the machine or voltage dips in the power supply system may be encountered.

To avoid these adverse effects, a so-called soft starter may be used to start-up or ramp-down a three-phase electric motor. With a soft starter, mechanical loads in the operating mechanism can be reduced, causing also less strain to the power supply system. In this manner, simple and economically more efficient use of the motor and machinery and equipment connected thereto may be achieved.

A soft starter may need to be able to switch very large currents, especially if it has been adapted to start-up or ramp-down a larger motor. For example, SIEMENS soft starter SIRIUS 3RW44 is currently capable to operate a motor with a power of 710 kW at 400 V in an inline circuit, and up to 1200 kW at 400 V in an inside-delta circuit. This means that switching must be performed for single-phase currents exceeding 1000 A which is a very challenging task.

Contactors, especially air contactors, are commonly used in a soft starter to protect the soft starter against electric arc and to protect the motor and machinery and equipment connected thereto against adverse effects of a bypass.

The fact that contactors used in soft starters for the higher power range (for currents 29-1200 A and higher) are usually relatively large results in a correspondingly larger volume of the housing of a soft starter, thus increasing the material cost and making installation of the device more difficult and space-consuming.

SUMMARY

At least one embodiment of the invention enables reducing the size of a starting device for an electric motor or enables increasing the size of electronics cooling system in a starting device without increasing the size of the starting device.

At least one embodiment of the invention brings out a starting device for an electric motor that may have a smaller size.

In at least one embodiment, if in manufacturing a starting device for a three-phase electric motor, especially a soft starter, an arc quenching system is at least partly removed from a commercially available contactor that so becomes a modified contactor, which is then used as a contactor in the starting device, the starting device may be made smaller. Alternatively, in at least one embodiment, the more available space may be used for cooling the starting device, especially if the starting device has an electronic control unit.

A particularly advantageous benefit, in at least one embodiment, may be that since the contactors need not be specially manufactured, the cost for manufacturing the starting device can be kept low.

In particular, in at least one embodiment the starting device may be made smaller by removing an arc splitter chamber completely or in part, since the arc splitter chamber is usually relatively large. Further, size reduction can be obtained if at least one de-ion plate is removed.

The starting device may be made more stabile and robust against external forces, such as strain and torque, if external contact members of the starting device are connected to contact members of the modified contactor. The stability may be further improved by connecting an electronic control unit in parallel to said modified contactor from contact members of the modified contactor or from contact members of the starting device.

Because the modified contactor is smaller than the commercially available contactor, it becomes easier to make the parallel connection for the electronic control unit since it the contact members become better accessible.

In particular, if said commercially available contactor is an air contactor, the space saving may be considerable.

LIST OF DRAWINGS

In the following, the invention will be described in more detail with reference to example embodiments in the accompanying drawings in FIGS. 1 to 3, of which:

Same reference numerals refer to similar structural elements throughout the Figures.

DETAILED DESCRIPTION

Figure 1:
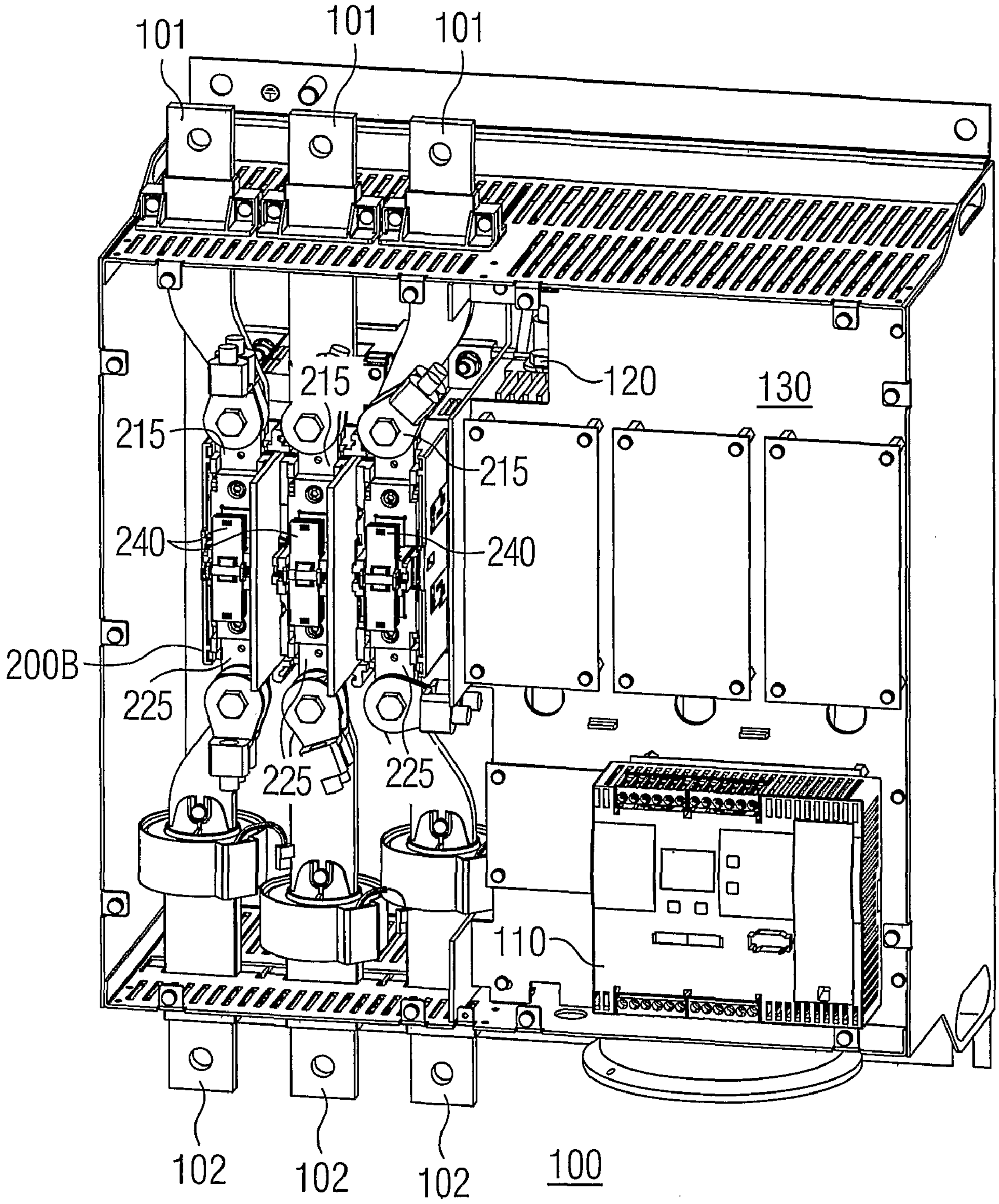
FIG. 1 illustrates a starter device.

FIG. 1 shows a starting device 100 that is a soft starter. The starting device 100 may be connected to power lines (not shown) via its contact members 101, of which there is preferably one contact member 101 for each phase, and to a three-phase electric motor (not shown) via its contact members 102, likewise of which there is preferably one contact member 102 for each phase.

The starting device 100 includes a user interface unit 110 that preferably remains visible from the cover (not shown) of the housing. The user may control the functioning of the starting device 100 via the user interface unit 110, e.g. set the operation current of the motor, or command the starting device 100 to start-up or ramp-down the electric motor.

The starting device 100 further includes an electronic control unit 120 that in FIG. 1 is shown partly covered by a support panel 130. The electronic control unit 120 preferably includes thyristors that may be used to control the start-up or ramp-down current of the electric motor which is sometimes referred to as semiconductor control.

In particular, the starting device 100 is adapted to switch the current instead of the electronic control unit 120 by contactor 200B as soon as the operation current of the motor has been reached or is about to be reached. The main reason for this is that a contactor 200B has much better energy efficiency than the semiconductor control, where heat dissipation of up to 3 W/A may be encountered, which would cause extensive heating up of the starting device with norm operating current of 880 A, for example.

The contactor 200B is preferably contacted to the power lines and the motor by contacting its contact members 215, 225 to contact members 101, 102, respectively.

Figure 2:
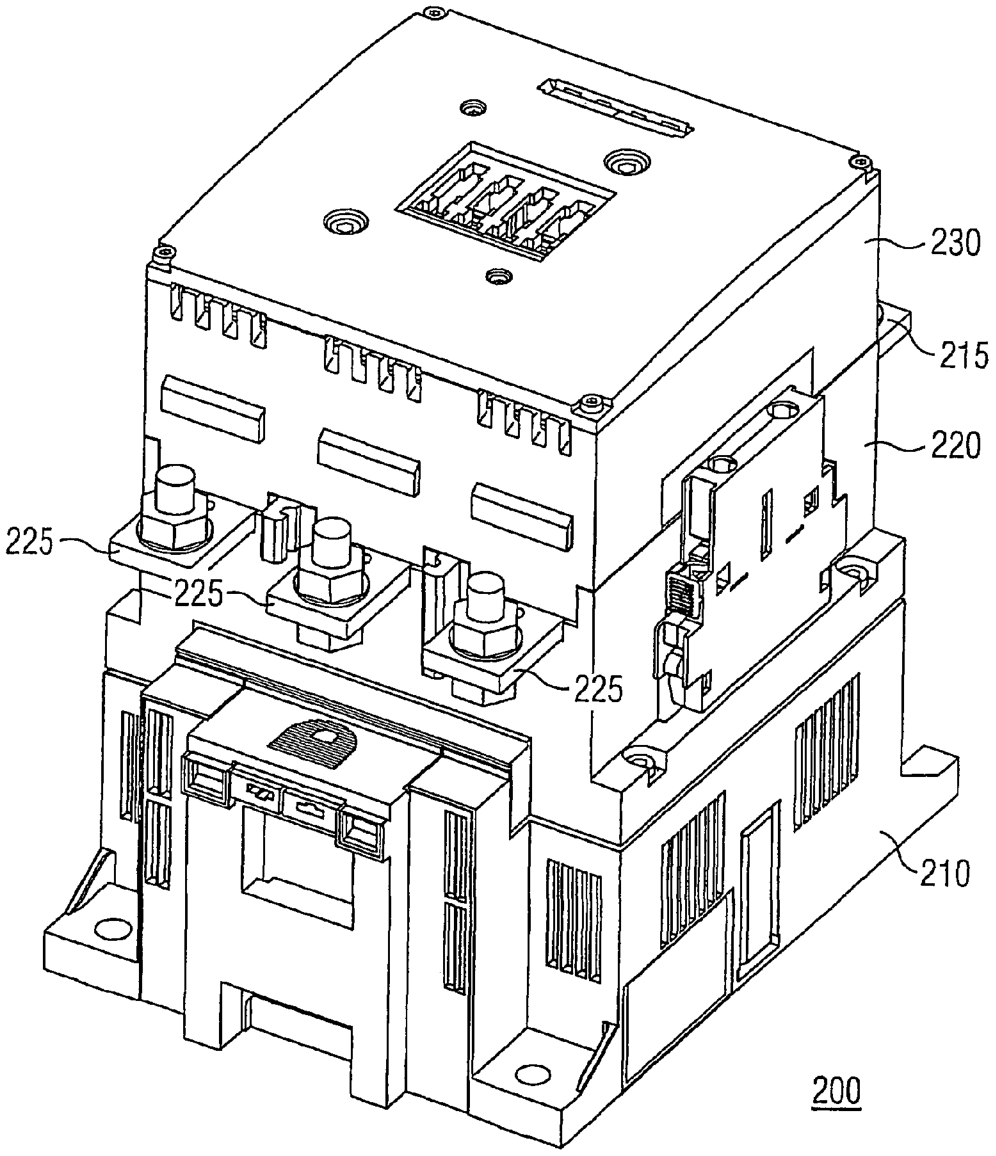
FIG. 2 illustrates a commercially available contactor.

FIG. 2 shows a commercially available contactor 200 that has been used in prior start devices. The commercially available contactor 200 is preferably suitable to be used within the higher power range, i.e. with currents larger than 29 A. A commercially available contactor 200 usually comprises a mounting base 210, a contactor part 220, and an arc quenching system 230. According to one aspect of the invention, before or during construction of the starting device 100, a commercially available contactor 200 is first modified to a modified contactor 200B and the modified contactor 200B is then used as contactor when assembling the starting device 100.

Figure 3:
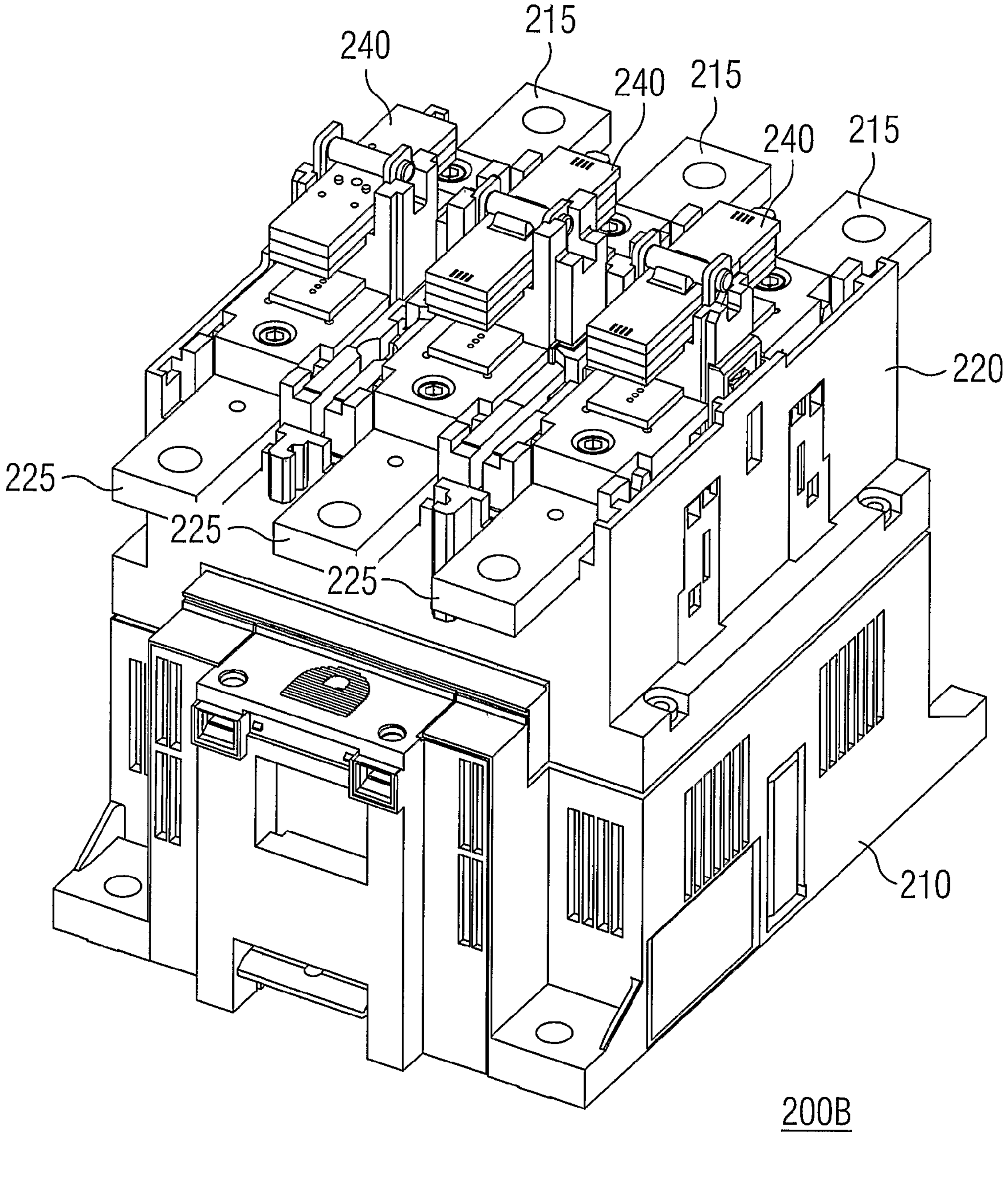
FIG. 3 illustrates a modified contactor.

FIG. 3 shows a modified contactor 200B. When performing the modifying, arc quenching system 230 is at least partly but preferably fully removed from the commercially available contactor 200 that so becomes to a modified contactor 200B. For SIRIUS 3RT14 air contactors, for example, this can be performed with a screw driver, since the arc quenching system is in a particular module that has been attached to the contactor 200 by screws. Sawing or other more powerful measures can nevertheless be used alone or in combination with the screw driver to get rid of the arc quenching system 230 or to make it smaller. Depending on the contactor 200, in the modified contactor 200B the movable contact elements 240 may thus become visible.

Basically, the art quenching system 230 includes an arc splitter chamber which may be a chamber filled with air. The arc splitter chamber may further include a series of de-ion plates, the function of which is to split the voltage causing the electric arc to smaller voltages, thereby efficiently eliminating the electric arc. Some or all walls of the arc splitter chamber may thus be removed, and if still more size reduction is necessary, some or preferably all of the de-ion plates may be dismounted or removed, fully or in part.

That the modified contactor 200B does not include an arc quenching system 230 any more does not cause a problem, since during starting-up and ramping-down of the motor, the current is controlled by the electronic control unit 120 through thyristors, where usually no arcing will take place.

After finishing starting-up, when the current fed to the motor has reached the operation current, the electronic control unit 120 and the modified contactor 200B are run in parallel for a moment before the current is passed fully through the modified contactor 200B. Because the switching from the electronic control unit 120 to the modified contactor 200B does not involve change of load, there will be no arcing.

Before starting ramping-down, the electronic control unit 120 and the modified contactor 200B are again run in parallel before the current is passed fully through the electronic control unit 120. Because the switching from the electronic control unit 120 to the modified contactor 200B does not involve change of load, there will be no arcing.

Even though the invention has been described by using particular examples, the skilled person readily appreciates that the invention is by no means limited to these embodiments but can be interpreted within the scope and spirit of the accompanying claims.

In particular, the commercially available contactor 200 may be an air contactor.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method of manufacturing a starting device for a three-phase electric motor, comprising:

at least partly removing an arc quenching system from a contactor to create a modified contactor;

attaching the modified contactor between an input contact member of the starting device and an output contact member of the starting device attachable to a load, wherein the at least partly removing an arc quenching system includes removing an arc splitter chamber, completely or in part, and the at least partly removing an arc quenching system includes removing at least one de-ion plate, completely or in part; and connecting an electronic control unit in the starting device in parallel to the modified contactor via contact members of at least one of the modified contactor and the starting device.

2. A method according to claim 1, further comprising connecting external contact members of the starting device to the contact members of the modified contactor.

3. The method of claim 1, wherein the starting device is a soft starter.

4. The method according to claim 1, wherein the at least partly removing an arc quenching system includes removing all one de-ion plates, completely or in part.

5. A method according to claim 1, wherein said contactor is an air contactor.

6. A starting device for a three-phase electric motor, comprising:

a modified contactor made from a contactor from which an arc quenching system has at least partly been removed; and an electronic control unit, connected in parallel to said modified contactor via contact members of at least one of the modified contactor and the starting device, wherein the arc quenching system is one from which at least one of an arc splitter chamber and at least one de-ion plate has been removed, completely or in part.

7. A starting device according to claim 6, further comprising: external contact members connected to the contact members of the modified contactor.

8. The starting device of claim 6, wherein the starting device is a soft starter.

9. A starting device according to claim 6, wherein said contactor is an air contactor.

10. A starting device according to claim 6, comprising:

a contactor comprising a partial arc quenching system.

11. A starting device according to claim 10, wherein the partial arc quenching system is one not including at least one of an arc splitter chamber and at least one de-ion plate.

* * * * *